United States Patent [19]
Frei et al.

[11] Patent Number: 5,833,212
[45] Date of Patent: Nov. 10, 1998

[54] VACUUM VALVE

[75] Inventors: Hugo Frei, Werdenberg; Peter Keller, Sevelen, both of Switzerland

[73] Assignee: Balzers Aktiengesellschaft, Balzers, Liechtenstein

[21] Appl. No.: 662,936

[22] Filed: Jun. 12, 1996

[30] Foreign Application Priority Data

Aug. 12, 1995 [DE] Germany ............. 295 13 000 U

[51] Int. Cl.⁶ .................................................. F16K 51/00
[52] U.S. Cl. ...................... 251/148; 251/144; 251/129.15
[58] Field of Search .................................. 251/144, 148, 251/129.15

[56] References Cited

U.S. PATENT DOCUMENTS

| | | | |
|---|---|---|---|
| 3,478,779 | 11/1969 | Gilmont et al. | 251/148 |
| 4,637,433 | 1/1987 | Stoll | 251/148 |
| 5,082,243 | 1/1992 | Berglund et al. | 251/148 |

FOREIGN PATENT DOCUMENTS

| | | | |
|---|---|---|---|
| 1489083 | 10/1977 | United Kingdom | 251/148 |

*Primary Examiner*—A. Michael Chambers
*Attorney, Agent, or Firm*—Notaro & Michalos P.C.

[57] ABSTRACT

A vacuum valve is used in vacuum systems having connectors including an internally threaded system component with connector seal, a KF-thread flange with connector seal, and a nut collar with clamping rings and pipe. The valve includes one valve case with an interior and at least two spaced apart openings communicating with the interior. The case defines a valve seat and has a valve member movable in the interior and into positions against the valve seat and away from the valve seat to close and open the valve. A driver is connected to the valve case for moving the valve member. A separate externally threaded nipple is provided around each opening and special sealing surfaces are on each nipple for connection to each of the vacuum system connectors in a vacuum-tight manner.

11 Claims, 2 Drawing Sheets

VACUUM VALVE

FIELD AND BACKGROUND OF THE INVENTION

The present invention relates, in general, to vacuum valves and, in particular, to a new and useful vacuum valve having one valve driver and one valve case with at least two valve connections.

In vacuum technology, vacuum valves are being used in many ways and for many purposed. The aim is always to separate and tightly seal the different regions on opposite sides of the valve. The media to be separated are gaseous, for instance, air or process gases. Valves used for vacuum technology have to meet high demands on functional and operational safety because they are often used in large numbers, in a single system. Depending on the actual application, special attention must be paid to the design of the shut-off member. Both the mechanical construction and also the conductance value and degree of tightness of the valve are very important. Besides the vacuum-tight shut-off function, valves may also have a regulating function and may, if necessary, also be constructed as regulating valves, so that a certain and preset conductance value or passage of medium through the valve, may be fixed. Vacuum-tightly-closing valves, which isolate vacuums from the atmosphere, usually need to comply with high standards for their degree of tightness. In other words, they must have a low leak rate. Vacuum valves which must also pass process gas must be both, precise and tight, in order to meet the high standard of purity which are required in the processes of vacuum technology. Under normal vacuum conditions, the leak rates at the external end of the valve and at the valve seat have to be at most $10^{-5}$ millibar liter/sec. However, in applications of high purity, the leak rates required are preferably lower than $10^{-9}$ millibar liter/sec. In larger cross sections, such as at the connections between high vacuum pumps and vacuum chambers, plate valves and gate valves may be used. For smaller cross sections, so-called angle valves have proven to be particularly reliable in practice. Angle valves may be constructed in a way that their conductance value, at maximum opening, in the coarse and medium vacuum ranges, is more or less equivalent to the conductance value of pipe components for the system. Even under high and ultra-high vacuum conditions, which are also called molecular flow conditions, the conductance value of angle valves is hardly any lower than the conductance value of comparable pipe components. Valves are usually constructed as components whose valve connections are designed as detachable flange connections which have a sealing force. Thus, valve connections are usually attached to the valve case in the form of flanges, for instance, so-called small flanges (KF). Various forms of valve drivers are known, for instance, manual, pneumatic, hydraulic, motor-driven and electromagnetic. In combination with so-called angle valves, the use of a single-acting electromagnetic driver is particularly advantageous. One disadvantage of the common valve designs is that their connecting region is clearly defined, and therefore, does not allow the application of different connecting techniques in one single valve connection. The use of different pipe components at the same valve requires common valves to have special adapters, which, firstly, increase the expense considerably, and, secondly, have a negative effect on the characteristic features of the vacuum, thus, resulting in a bad effect on the overall economy. Moreover, such transition pieces are generally not available on the market but must be custom made.

SUMMARY OF THE INVENTION

The various features of novelty which characterize the invention are pointed out with particularity in the claims annexed to and forming a part of this disclosure, and are based on the German priority application no. 295 13 000.8 filed Aug. 12, 1995.

The task of the present invention is to eliminate the disadvantages of the current state-of-the-art. The aim is to create a valve case which offers universally combinable connecting options, enabling the user to choose an optimal connecting option, and to make the implementation of the user's ideas easy. In addition, the valve of the present invention allows for high efficiency in production, storage management and application.

The connection problem is solved according to the invention by providing a vacuum valve for use in vacuum systems having various types of connectors including an internally threaded system component with connector seal, a KF-thread flange with connector seal, and/or a nut collar with clamping rings and pipe. The valve comprising one valve case with an interior and at least two spaced apart openings communicating with the interior, the case defining a valve seat. A valve member is movable in the interior and into positions against the valve seat and away from the valve seat to close and open the valve. One driver is connected to the valve case for moving the valve member, and a separate externally threaded nipple is provided around each opening. Surface means on each nipple are provided for connection to each of the vacuum system connectors in a vacuum-tight manner.

For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The present invention is described, for example, by the following diagrams, wherein.

DESCRIPTION OF THE PREFERRED EMBODIMENTS

The drawings depict an example of the vacuum valve of the present invention, which allows connection to different vacuum system connectors or fittings, using one single valve case. The solution proposed is particularly advantageous for angle valves. With regard to angle valves, it is most advantageous to employ a single-acting electromagnetic driver.

Figures 1, 2, 3:
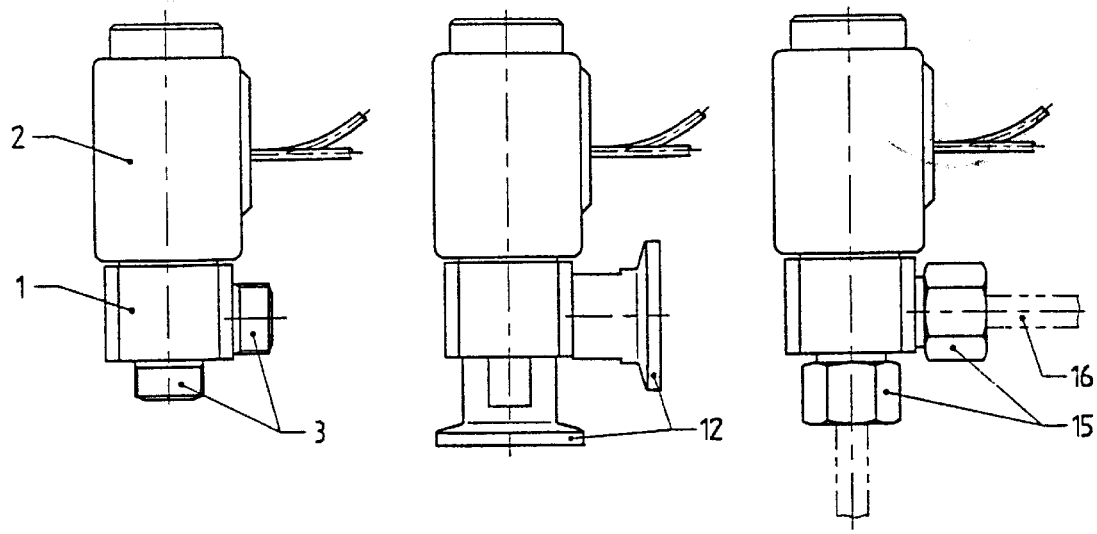
FIG. 1 is a side view of an angle valve of the invention with two threaded connectors.
FIG. 2 is a side view of the angle valve with small flanges or KF fittings connected to the connectors.
FIG. 3 is a side view of the angle valve with screw plus clamping-ring fittings for pipes connected.

FIG. 1 is a side view of an angle valve which consists of one valve driver 2 and one valve case 1. The case 1 has two nipples 3, for use with various vacuum system connectors, such as pipe connections. Although the case in the example can connect to two pipe fittings, such a valve may, of course, have means for connection to several other connectors.

Figures 4, 5, 6:
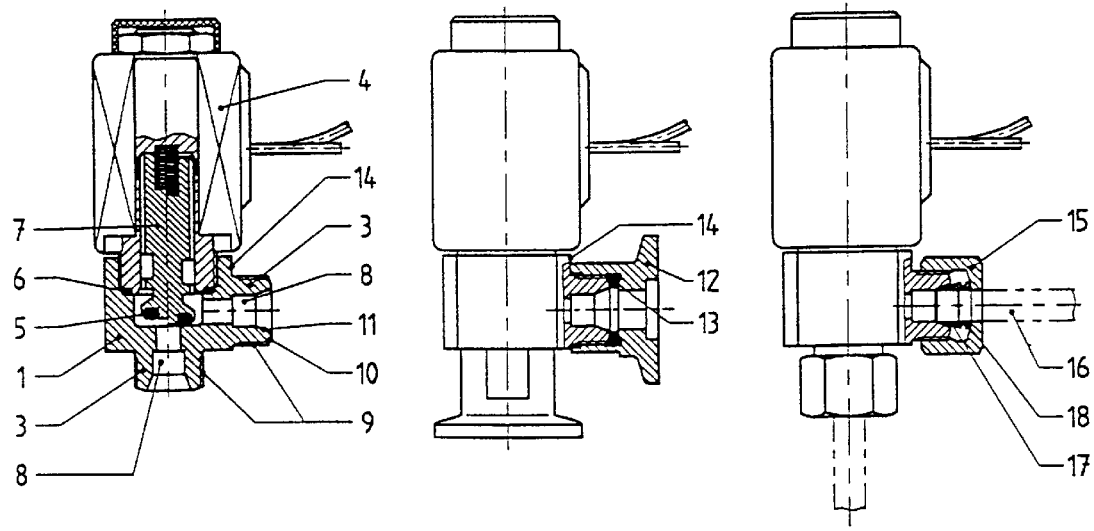
FIG. 4 is a cross sectional view of the angle valve of FIG. 1.
FIG. 5 is a cross sectional view, partly in elevation, of the angle valve of FIG. 2.
FIG. 6 is a cross sectional view, partly in elevation, of the angle valve of FIG. 3.

FIG. 4 illustrates details which are shown in cross section. The valve driver comprising a lifting electromagnet 4, which includes its own case, and in which a valve member or plate 7 is also designed as a magnet armature and is spring-suspended. The bottom end of the valve plate 7 has a valve plate seal 5 attached thereto. When electric current is flowing through the electromagnet 4, the magnet armature with valve plate 7 is lifted, consequently opening valve connection openings 8 and allowing flow between the connectors. When electromagnet 4 is in a currentless state, a spring shown in FIG. 4 presses valve plate 7 against the sealing surface or valve seat in the interior of valve case 1. Of course, the process described may also be inverted: the valve, whose design has been adapted, may, for instance, be operated in a normally open, currentless state. The whole valve driver 2 is, for instance, screwed into the valve case 1 and is tightly sealed by means of valve case seal 6 also shown in FIG. 7. Each nipple 3 for the pipe connections has an external thread 9 shown in FIG. 4, to which the valve may be screw-coupled in a forcefit or frictional connection. Additionally, each nipple 3 contains its own central opening 8. Valve case 1 includes a stop shoulder 14 at the interface between the inner end of thread 9 and the body of case 1. The stop shoulder determines a defined length of the nipple 3. Consequently, the screw-coupling position of a KF-thread flange 12 (FIG. 7), containing an inner thread is defined. This means that the KF may be connected to a stop shoulder 14 by a formfit connection. Attached to the connecting end of the nipple at the opening 8 is an inner sealing cone 11 which may accommodate parts of a screw-clamping ring for pipes. Furthermore, attached to the connecting end of the nipple is an outer sealing cone 10 which has outer sealing surfaces like the inner sealing cone 11. The outer sealing cone 10 serves to accommodate and tightly seal an elastomeric seal 13. According to FIG. 4, the valve case 1 with the nipples 3 is constructed in a way that the valve case may (a) either be directly screwed and sealed into a system component 19 shown in FIG. 8 by the use of a seal 13, or (b) may be connected to KF 12 or to a screw clamping connection (15, 16, 17, 18). FIGS. 2 and 5 show option (b) with the mounted KF 12. FIG. 5 illustrates how the KF is screw-coupled against the stop shoulder 14. In this arrangement, the elastomeric seal 13 is sealed and pressed between the outer sealing cone 10 of nipple 3 and the sealing surface of KF 12, in a well-defined manner.

FIGS. 3 and 6 depict a arrangement with a mounted screw-clamping ring for pipes. Such screw-clamping rings for pipes are quite frequently used in vacuum technology because their metallic seal meets extraordinarily high requirements of purity. Most suitable and well-known are screw components for pipes with dimensions of the Swagelok type, manufactured by the Swagelok Co., Solon Ohio 44139. As shown in FIGS. 3 and 6, such a connection consists of a collar nut 15 which has a central opening for the accommodation of a pipe 16, whereby the collar nut 15 tightly presses both a front clamping ring 17 and a back clamping ring 18, which are pressed against the pipe. These components may be standard components, the front clamping ring 17 being pressed and sealed against the inner sealing cone 11 of the valve case 1 and against the pipe 16. In this process, the collar nut 15 is screw-coupled together with the outer thread 9 of nipple 3. In order to precisely accommodate pipe 16, the central opening 8 is constructed as a stepped opening in such a way that the end of pipe 16 may be inserted and stopped against a stop shoulder in the stepped opening of nipple 3 as shown in FIG. 8. In this case the inner diameter of pipe 16 mainly corresponds to the diameter of opening 8, outside the stop shoulder. The enlarged cross sections of FIGS. 7 and 8 help better illustrate the functions described above. Moreover, these cross sections illustrate how the invention makes it possible to choose from a range of connecting options, which may all be applied to one single valve case.

Figure 7:
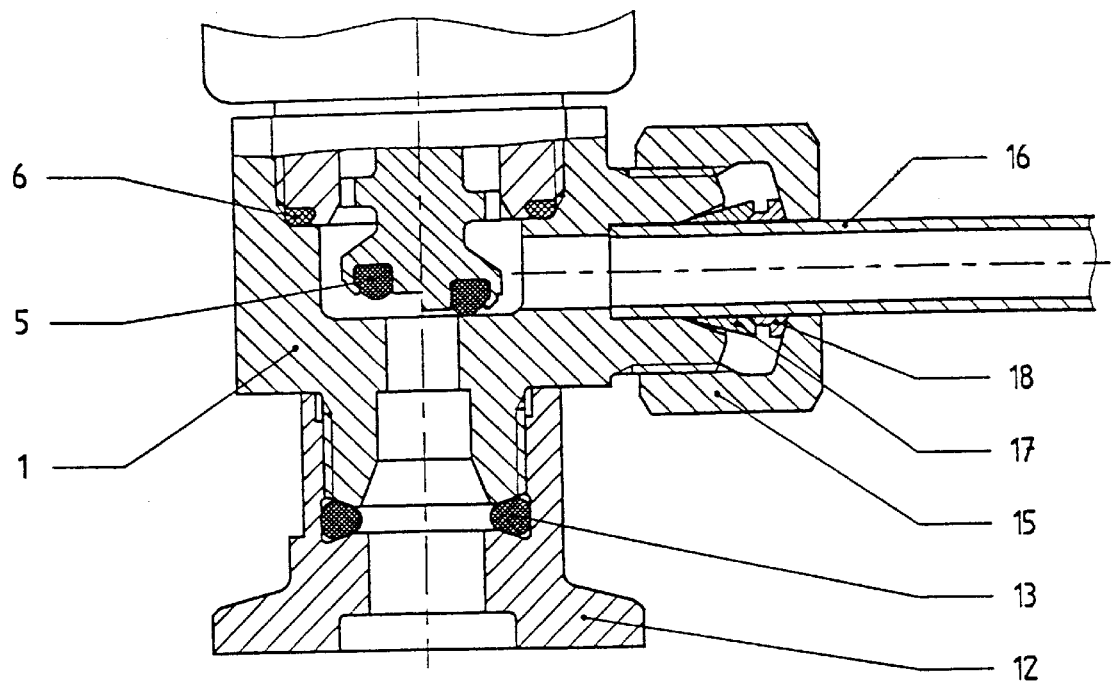
FIG. 7 is a cross sectional view of a valve case of the invention with a screw-clamping-ring fitting for pipes and a KF-flange connector.
Figure 8:
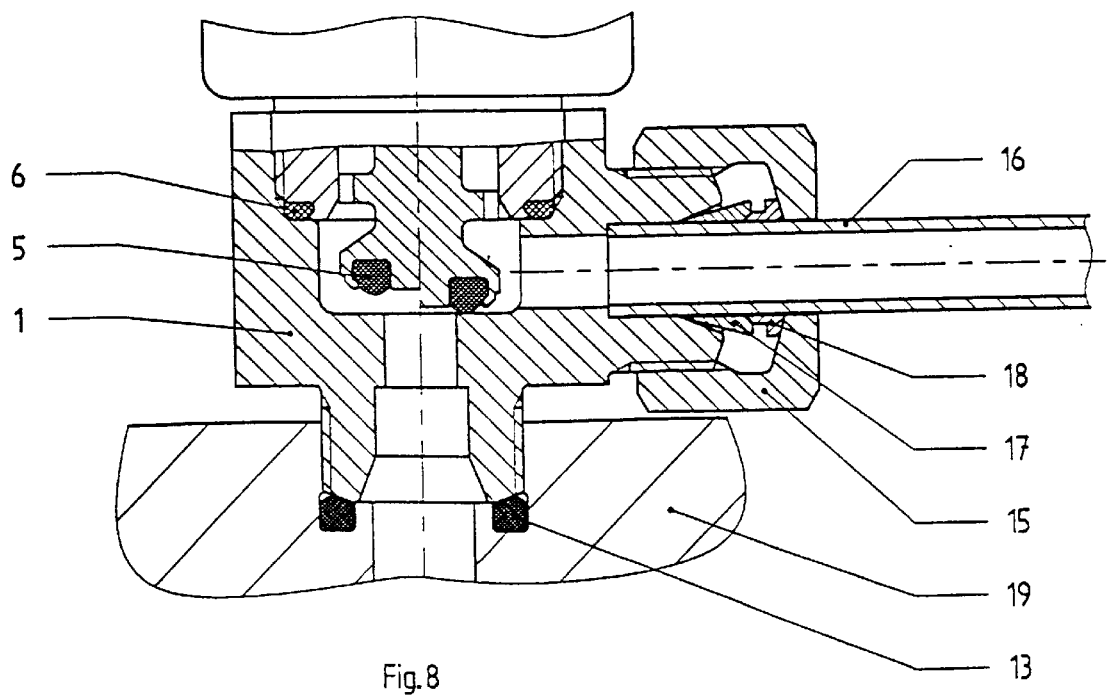
FIG. 8 is a cross sectional view of a valve case of the invention with two fittings, one of them being screwed directly into a system component and the other being provided with a screw-clamping-ring fitting for pipes.

FIG. 7, for instance, depicts a combination of a screw-clamping ring 15, 17, 18 for pipes 16 attached to one valve fitting, and a small KF flange 12 configuration attached to the other valve fitting.

FIG. 8, for instance, depicts a screw-clamping ring for pipes attached to one valve fitting, whereas the other valve fitting is directly sealed at 13, and screwed, for instance to a customer's vacuum system component 19.

Another feature of the invention permits the use of various diameters of clamping-ring connections to the same valve. The inclination of the internal sealing cone 11 at nipple 3 is preferably implemented in such a way that the cone can accommodate and seal different sizes of a front clamping ring 17. This inclination can be determined by trial and optimized for the various diameters to be used. However, it is preferable not to use more than two different diameters of pipes whose width is either measured in inches or in a metric measurement. A particularly suitable valve arrangement is reached by a valve size provided with connecting nipples 3 which may accommodate both a pipe diameter of ¼ inch and a pipe diameter of 6 mm. As mentioned above, the implementation of such a particularly suitable configuration requires (a) the internal sealing cone to have exactly the inclination which is suitable for both dimensions and (b) to drill a stepped opening inside a larger diameter of bore 8.

For the pipe diameters mentions above, the two Swaglok components which may be used are a ¼-inch diameter for both the a front clamping ring 17 designated SS-403-1 and a back clamping ring 18 designated SS-404-1, and for a 6 mm diameter both a front clamping ring SS-6M3-1 and a back clamping ring SS-6M4-1. The collar nut 15 is designed to fit, for instance, nipple 3 and may have, for instance, an internal thread M14×1; the collar nut thereby having an opening compatible to accommodate the pipe 16 with the larger diameter.

The valve design described allows universal application and easy handling. Due to the small number of components necessary and the simple installation, the valve arrangement may be built in a cost-efficient manner.

While a specific embodiment of the invention has been shown and described in detail to illustrate the application of the principles of the invention, it will be understood that the invention may be embodied otherwise without departing from such principles.

What is claimed is:

1. A vacuum valve for use in vacuum systems having connectors including an internally threaded system component (19) with connector seal (13), a KF-thread flange (12) with connector seal (13), and a nut collar (15) with clamping rings (17, 18) and pipe (16), the valve comprising:

one valve case (1) with an interior and at least two spaced apart openings (8) communicating with the interior, the case defining a valve seat;

a valve member (7) movable in the interior and into positions against the valve seat and away from the valve seat to close and open the valve;

one driver (2) connected to the valve case for moving the valve member;

a separate externally threaded (9) nipple (3) around each opening (8); and surface means (10, 11) on each nipple for connection to each of the vacuum system connectors in a vacuum-tight manner.

2. A valve according to claim 1, wherein each opening is centered in its respective nipple, an outer stop shoulder (14) define on the valve case, at an inner end of the external thread of each nipple, the surface means including an external sealing cone (10) having a sealing surface for accommodating an elastomeric seal (13) for a vacuum-tight connection to a KF-thread flange (12) and to a threaded system component (19), the surface means including an internal sealing cone (11) for receiving a clamping ring (17, 18), the central opening (8) being stepped with an inner shoulder for receiving an end of a pipe (16) to be held by a nut collar (15) and sealed by the clamping rings (17, 18) to the central opening.

3. A vacuum valve according to claim 2, wherein the internal sealing cone (11) is dimensioned and shaped for accommodating clamping rings of different diameters.

4. A vacuum valve according to claim 3, wherein the internal sealing cone is dimensioned and shaped for receiving pipe diameters of ¼ inch and of 6 mm.

5. A vacuum valve according to claim 1, wherein each nipple is shaped for connection to a Swagelok connector.

6. A vacuum valve for use in vacuum systems having connectors including an internally threaded system component with connector seal, a KF-thread flange with connector seal, and a nut collar with clamping rings and pipe, the valve comprising:

one valve case;

a valve member movable in the case;

one driver connected to the valve case for moving the valve member;

at least two separate externally threaded nipple connectors for connection to any of the connectors; and surface means on each nipple for sealing to each of the vacuum system connectors in a vacuum-tight manner.

7. A vacuum valve according to claim 6, wherein the valve case has an interior, each nipple connector having a central opening extending therethrough and communicating with the interior.

8. A valve according to claim 7, wherein each opening is centered in its respective nipple, a stop shoulder (14) define on the valve case at an inner end of external threads of each nipple, the surface means including an external sealing cone (10) which a sealing surface for accommodating an elastomeric seal (13) for a vacuum-tight connection to a KF-thread flange (12) and to a threaded system component (19), the surface means including an internal sealing cone (11) for receiving a clamping ring (17, 18), the central opening (8) being stepped for receiving an end of a pipe (16) to be held by a nut collar (15) and sealed by the clamping rings (17, 18) to the central opening.

9. A vacuum valve according to claim 8, wherein the internal sealing cone (11) is dimensioned and shaped for accommodating clamping rings of different diameters.

10. A vacuum valve according to claim 9, wherein the internal sealing cone is dimensioned and shaped for receiving pipe diameters of ¼ inch and of 6 mm.

11. A vacuum valve according to claim 6, wherein each nipple is shaped for connection to a Swagelok connector.

* * * * *